(12) United States Patent
Lu et al.

(10) Patent No.: US 9,684,401 B2
(45) Date of Patent: Jun. 20, 2017

(54) TOUCH ELECTRODE AND FABRICATING METHOD THEREOF, CAPACITIVE TOUCH DEVICE AND TOUCH DISLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan Province (CN)

(72) Inventors: Youqiang Lu, Beijing (CN); Yun Qiu, Beijing (CN); Jing Wang, Beijing (CN)

(73) Assignees: BOE Technology Group Co., Ltd., Beijing (CN); Chengdu BOE Optoelectronics Technology Co., Ltd., Chengdu (CN)

( * ) Notice: Subject to any disclaimer, the term of this patent is extended or adjusted under 35 U.S.C. 154(b) by 0 days.

(21) Appl. No.: 14/358,477

(22) PCT Filed: Dec. 7, 2013

(86) PCT No.: PCT/CN2013/088825
§ 371 (c)(1),
(2) Date: May 15, 2014

(87) PCT Pub. No.: WO2014/176902
PCT Pub. Date: Nov. 6, 2014

(65) Prior Publication Data
US 2015/0193064 A1    Jul. 9, 2015

(30) Foreign Application Priority Data
May 2, 2013 (CN) .......................... 2013 1 0157852

(51) Int. Cl.
G06F 3/041 (2006.01)
G06F 3/044 (2006.01)

(52) U.S. Cl.
CPC ............ *G06F 3/0412* (2013.01); *G06F 3/044* (2013.01); *G06F 2203/04103* (2013.01); *Y10T 29/49105* (2015.01)

(58) Field of Classification Search
CPC .................. G06F 3/0412; G06F 3/044; G06F 2203/04103;
(Continued)

(56) References Cited

U.S. PATENT DOCUMENTS 5,386,219 A * 1/1995 Greanias ................. G06F 3/044
345/174
2011/0057900 A1 * 3/2011 Huang .................... G06F 3/044
345/174
(Continued)

FOREIGN PATENT DOCUMENTS

CN    101398539 A    4/2009
CN    101661358 A    3/2010
(Continued)

OTHER PUBLICATIONS

Jun. 30, 2015—(CN)—First Office Action for Appn 201310157852.7 with Eng Tran.
(Continued)

*Primary Examiner* — Liliana Cerullo
(74) *Attorney, Agent, or Firm* — Banner & Witcoff, Ltd.

(57) ABSTRACT

The present invention disclose a touch electrode structure and a fabricating method thereof, a capacitive touch device and a touch display device to improve the touch linearity and the report rate of the capacitive touch device. The touch electrode structure provided by the embodiments of the present invention comprises a plurality of electrode assemblies and a plurality of electrode pins for connecting a touch circuit. Wherein, each electrode assembly comprises two electrodes which are disposed at the same layer, insulated
(Continued)

from each other and cross with each other complementarily, and each electrode comprises at least two sub-electrodes which are in mutual electrical connection with each other. The sub-electrodes of different electrodes of each electrode assembly are spaced apart from each other one by one, and each electrode is connected with an electrode pin.

15 Claims, 6 Drawing Sheets

(58) Field of Classification Search
CPC ... G06F 2203/04111–2203/04112; F21V 5/02; F21V 5/007
See application file for complete search history.

(56) References Cited

U.S. PATENT DOCUMENTS

| | | | | |
|---|---|---|---|---|
| 2012/0105133 | A1* | 5/2012 | Kim | G06F 3/044 327/517 |
| 2012/0256873 | A1* | 10/2012 | Herman | G06F 3/044 345/174 |
| 2013/0293790 | A1* | 11/2013 | Chang | G02F 1/133514 349/12 |
| 2014/0052398 | A1 | 2/2014 | Wang et al. | |

FOREIGN PATENT DOCUMENTS

| | | |
|---|---|---|
| CN | 102033672 A | 4/2011 |
| CN | 102282534 A | 12/2011 |
| CN | 102375635 A | 3/2012 |
| CN | 202159324 U | 3/2012 |
| CN | 102707514 A | 10/2012 |
| CN | 102770894 A | 11/2012 |
| CN | 102830877 A | 12/2012 |
| CN | 102830881 A | 12/2012 |
| CN | 102855043 A | 1/2013 |
| CN | 102902390 A | 1/2013 |
| CN | 202815799 U | 3/2013 |
| CN | 103268179 A | 8/2013 |
| CN | 203224862 U | 10/2013 |

OTHER PUBLICATIONS

International Search Report for International Application No. PCT/CN2013/088825, 12pgs.

Nov. 3, 2015—International Preliminary Report on Patentability PCT/CN2013/088825.

Nov. 26, 2015—(CN) Second Office Action Appn 201310157852.7 with English Tran.

\* cited by examiner

--Prior Art--

--Prior Art--

--Prior Art--

TOUCH ELECTRODE AND FABRICATING METHOD THEREOF, CAPACITIVE TOUCH DEVICE AND TOUCH DISLAY DEVICE

CROSS REFERENCE TO RELATED APPLICATIONS

This application is based on International Application No. PCT/CN2013/088825 filed on Dec. 7, 2013, which claims priority to Chinese National Application No. 201310157852.7 filed on May 2, 2013. The entire contents of each and every foregoing application are incorporated herein by reference.

TECHNICAL FIELD

The present invention involves the technical field of display, and especially, relates to a touch electrode structure and a fabricating method thereof, a capacitive touch device, and a touch display device.

BACKGROUND

Traditional touch display devices are mainly formed by forming a touch sensor on a substrate (for example, a glass substrate) to form a sensor glass and then attaching the sensor glass to a protective layer and a LCD (liquid crystal display), and the object of touch display is achieved.

As shown in FIG. 1, the touch electrode structure in the touch sensor comprises: a plurality of electrode assemblies 61' formed on the substrate 60' and electrode pins 62' for connecting a touch circuit, wherein each electrode assembly comprises two triangular electrodes 611' insulated from each other and complementarily crossing with each other, and each electrode is connected with an electrode pin. Correspondingly, the section structure of the touch substrate along the direction A-A' in FIG. 1 is shown in FIG. 2. Generally, the distance between the electrode pins is within the range of 6-8 mm, while the gap (the distance between the adjacent triangular electrodes in FIG. 1) between ITOs is within the range of 50-100 μm. Such an electrode structure design can meet usual application needs.

However, in the above electrode structure design, there may exists the possibility that a touch point cannot be reported normally, as shown in FIG. 3, wherein, A1, A2 and A3 respectively represent the touch positions of a finger on a touch screen. When A1 and A2 are touched, as two adjacent electrodes are touched at the same time, the coordinates can be correctly calculated. However, when A3 is touched, only one electrode is touched, the coordinates of the position A3 cannot be correctly calculated. In practical use, the situation of touching A3 cannot be avoided, for example, the test situation of a touch width of 5 mm or the touch by the fingertip of little finger.

Report rate is an index of evaluating touch sensitivity, and the higher the report rate is, the better the sensitivity is, and then the position of a touch point can be reflected more correctly. From the above analysis, the above electrode structure design has some defects and cannot ensure correct report of each touch point, that is, it cannot ensure that the coordinates of the touch position of each touch can be correctly calculated.

SUMMARY

The embodiments of the present invention provide a touch electrode structure, a capacitive touch device and a touch display device to improve the touch linearity and the report rate of the capacitive touch device.

The touch electrode structure provided by the embodiments of the present invention comprises a plurality of electrode assemblies and a plurality of electrode pins for connecting a touch circuit, wherein, each electrode assembly comprises two electrodes which are disposed at the same layer, insulated from each other and cross with each other complementarily, and each electrode comprises at least two sub-electrodes which are in mutual electrical connection with each other, and the sub-electrodes of different electrodes of each electrode assembly are spaced apart from each other one by one; and each electrode is connected with an electrode pin.

The capacitive touch device provided by the embodiments of the present invention comprises the above touch electrode structure.

The touch display device provided by the embodiments of the present invention comprises a touch layer and a display panel, and the touch layer is formed on the display panel and comprises the above touch electrode structure.

The fabricating method of the touch electrode structure provided by the embodiments of the present invention comprises: forming a plurality of electrode assemblies and a plurality of electrode pins for connecting a touch circuit through a one-time composition process, wherein, each electrode assembly comprises two electrodes which are disposed at the same layer, insulated from each other and cross with each other complementarily, and each electrode comprises at least two sub-electrodes which are in mutual electrical connection with each other, and the sub-electrodes of different electrodes of each electrode assembly are spaced apart from each other one by one; and each electrode is connected with an electrode pin.

The embodiments of the present invention provide a touch electrode structure and a fabricating method thereof, a capacitive touch device and a touch display device. The touch electrode structure provided by the embodiments of the present invention enlarges a touch-related electrode area without adding pins or changing the distance between the pins in the prior art, and ensures correct report of touch points and improves the touch report rate and linearity when applied in a touch display device.

BRIEF DESCRIPTION OF THE DRAWINGS

In order to clearly illustrate the technical solutions of the embodiments of the invention, the drawings of the embodiments will be briefly described in the following. It is obvious that the described drawings are only related to some embodiments of the invention and thus are not limitative of the invention.

DETAILED DESCRIPTION

Figure 1:
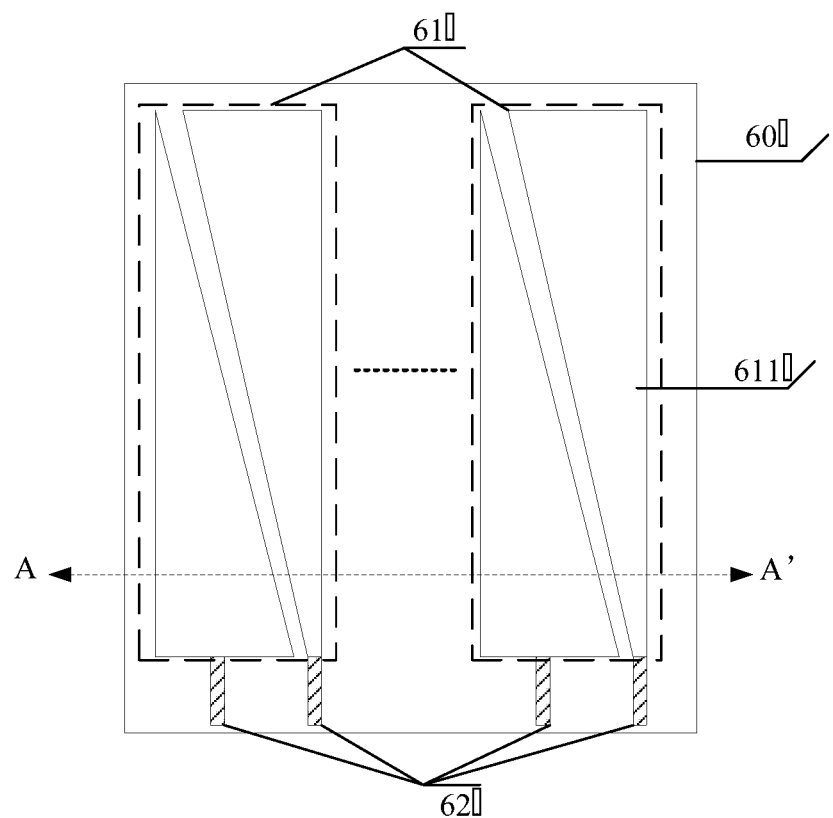
FIG. 1 is a planar schematic diagram of a touch electrode structure in the prior art.
Figure 2:
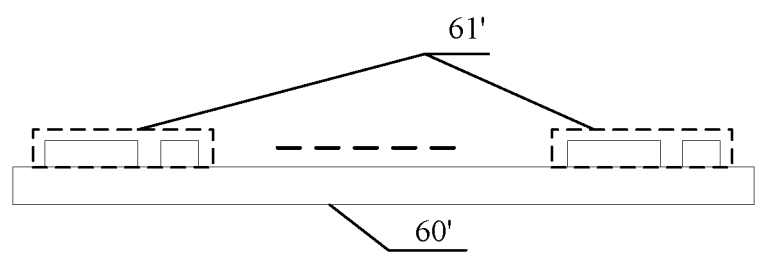
FIG. 2 is a structural schematic diagram of the section layer of the structure shown in FIG. 1 along a direction A-A'.
Figure 3:
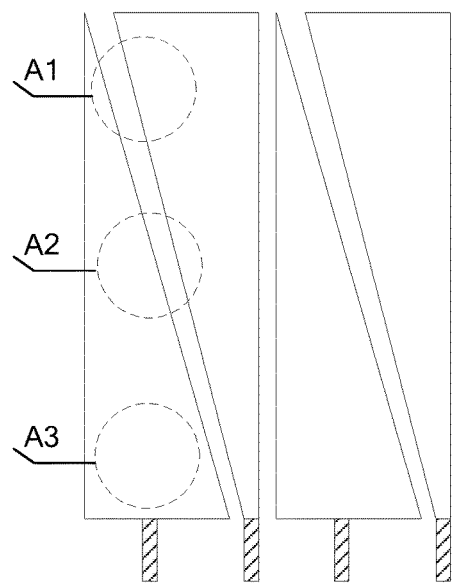
FIG. 3 is a schematic diagram of the touch area of the structure shown in FIG. 1.

In order to make the objects, technical details and advantages of the embodiments of the invention more apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, the technical terms or scientific terms used herein should be the general meanings understood by one having ordinary skills in the field of the present invention. The terms "one", "a", "the" and similar terms do not represent limitation on amount while refer to at least one. Similar terms such as "including" or "containing" refer to that an element or article preceding the terms "including" or "containing" covers the elements, articles and equivalents thereof listed after the terms "including" or "containing", and do not exclude other elements or articles. Similar terms such as "connect" or "couple" are not limited to physical or mechanical connections, and can comprise electrical connection, no matter direct or indirect. Terms such as "upper", "lower", "left" and "right" are only intended to represent relative position relationships, when the absolute position of a described object is changed, the relative position relationships may be changed correspondingly.

The embodiments of the present invention provide a touch electrode structure, a capacitive touch device and a touch display device, to improve the touch linearity and the report rate of the capacitive touch device.

The embodiments of the present invention provides a touch electrode structure comprising a plurality of electrode assemblies and a plurality of electrode pins for connecting a touch circuit, wherein, each electrode assembly comprises two electrodes which are disposed at the same layer, insulated from each other and cross with each other complementarily, and each electrode comprises at least two sub-electrodes which are in mutual electrical connection with each other, and the sub-electrodes of different electrodes of each electrode assembly are spaced apart from each other one by one.

During practical implementation, for example, the two sub-electrodes can have the same shape, which helps to calculate the coordinates of the touch area.

For example, the sub-electrodes are in a triangular shape. The triangular electrodes in the prior art are taken as an example, and the triangular electrodes in the prior art are equally divided into two or more triangles in the embodiments of the present invention, depending on the need of touch precision. For example, the triangular electrodes in the prior art having a pin gap of 6 mm are equally divided into two small triangular sub-electrodes, and thus, the maximum touch area of each triangular sub-electrode is 3 mm, and then correct report of touch position can be ensured in case that the test of the touch width is 5 mm.

For example, the shape of the sub-electrodes is right triangle.

For example, the electrodes, the electrode pins and tag pins may be provided at the same layer. Providing the electrodes, the electrode pins and the tag pins at the same layer can simplify the process.

For example, the material of the touch electrode is a transparent conductive material or metal material. For example, the touch electrode structure for touch display is usually provided at the light exit side of the LCD. Thus, to ensure the display effect, the material of the touch electrode may be a transparent conductive material.

The touch electrode structure provided by the present invention will be described hereinafter in combination with the drawings and the exemplary embodiments. The exemplary embodiments are described taking the electrode comprising two sub-electrodes as an example but are not limitative to the present invention.

Figure 4:
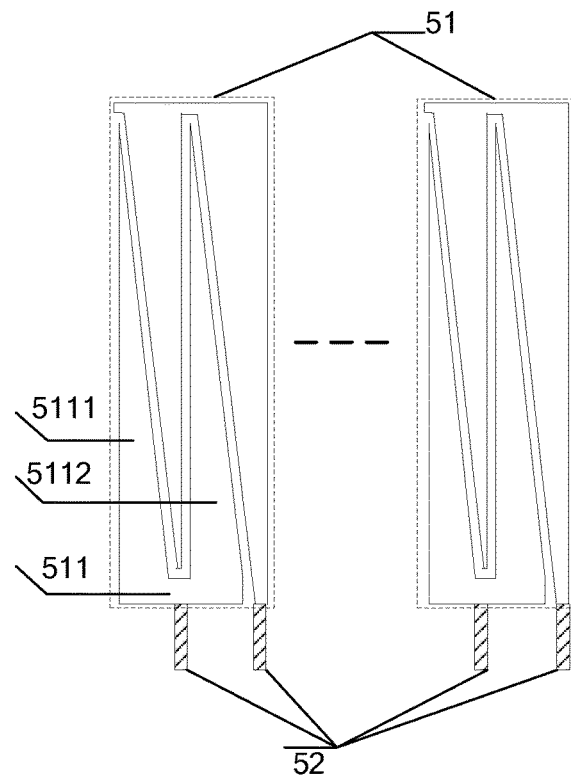
FIG. 4 is a planar schematic diagram of the touch electrode structure provided by the embodiments of the present invention.

As shown in FIG. 4, the touch electrode structure provided by the embodiments of the present invention comprises a plurality of electrode assemblies 51 and a plurality of electrode pins 52 for connecting a touch circuit, wherein, each electrode assembly 51 comprises two electrodes 511 which are insulated from each other and cross with each other complementarily, and each electrode comprises a sub-electrode 5111 and a sub-electrode 5112 which are in mutual electrical connection with each other, and the sub-electrodes of different electrodes 511 of each electrode assembly 51 are spaced apart from each other one by one; and each electrode 511 is connected with an electrode pin 52.

Figure 5:
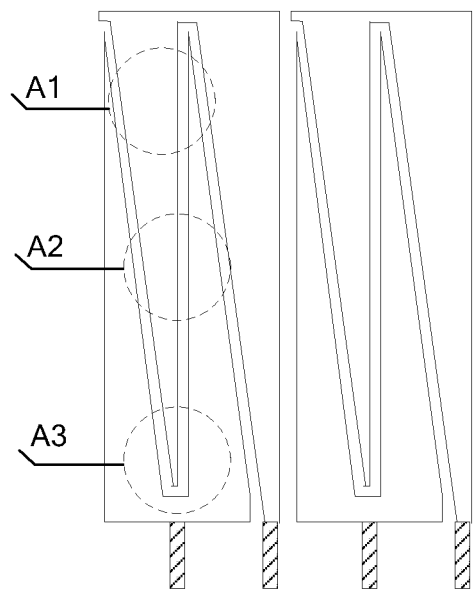
FIG. 5 is a schematic diagram of the touch area of the touch electrode structure provided by the embodiments of the present invention.

Without changing the distance between the electrode pins in the prior art, the gap between the electrode pins 52 is 6 mm, the maximum touch area of each sub-electrode is 3 mm, in a test of a touch width of 5 mm or a test using the fingertip of the little finger, accurate report of the touch position can be achieved. For example, as shown in FIG. 5, with respect to any one of the touch areas A1, A2 and A3, it can be ensured that the touch area can cover at least two electrodes. Thus the situation of only touching one electrode will not occur, and then the touch point can be accurately reported and the report rate and touch linearity are improved.

Figure 6:
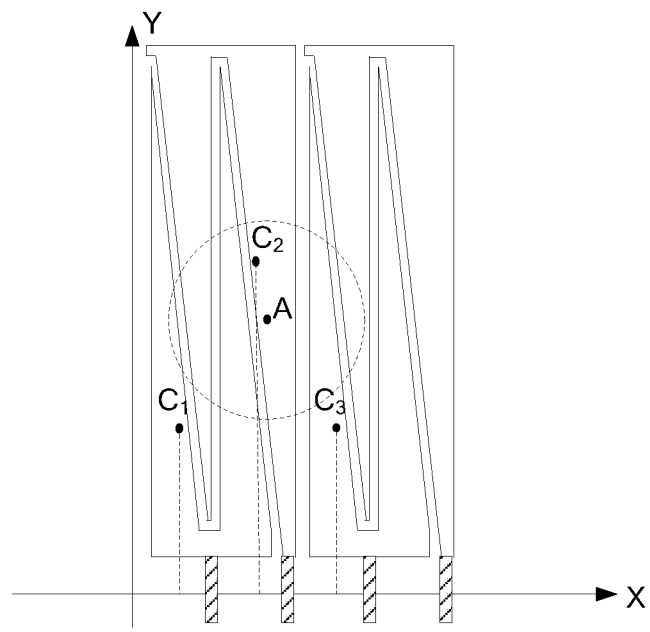
FIG. 6 is a planar schematic diagram illustrating the calculation of touch coordinates in a triangular electrode structure.

FIG. 6 is a schematic diagram of coordinates A of the touch position. When a touching object contacts the touch substrate, self-inductance capacitances C1, C2 and C3 between the object and the electrodes will be generated as shown in FIG. 6, and C1, C2 and C3 respectively correspond to a first passage, a second passage and a third passage. Taking C1=10, C2=30 and C3=30 as an example, the coordinates of point A are calculated as following: X=(10×+30×2+20×3)/(10+30+20)=2.167, Y=30/(10+20)=1. Thus, the coordinates of point A is (2.167, 1), and 1, 2 and 3 in the formula are the passage values of the first passage, the second passage and the third passage, respectively; then, in the touch circuit, the physical coordinates of point A are mapped to the resolution of the LCD to obtain the coordinate position of point A at the LCD. Wherein, it should be noticed that the process of mapping the physical coordinates of point A to the resolution of the LCD to obtain the coordinate position of point A at the LCD is the same with the prior art and then details are omitted herein.

Corresponding to the above touch electrode structure provided by the embodiments of the present invention, the embodiments of the present invention provide a fabricating method of the touch electrode structure, comprising:

forming a plurality of electrode assemblies and a plurality of electrode pins for connecting a touch circuit through a one-time composition process, wherein, each electrode assembly comprises two electrodes which are disposed at the same layer, insulated from each other and cross with each other complementarily, and each electrode comprises at least two sub-electrodes which are in mutual electrical connection with each other, and the sub-electrodes of different electrodes of each electrode assembly are spaced apart from each other one by one; and each electrode is connected with an electrode pin.

The capacitive touch device provided by the embodiments of the present invention will be described hereinafter.

The capacitive touch device provided by the embodiments of the present invention comprises the above touch electrode structure. Wherein, the capacitive touch device can be a touch keyboard, a touch display device and the like, and all possible capacitive touch devices shall fall within the scope of protection of the present invention.

The touch display device provided by the embodiments of the present invention will be described hereinafter.

The touch display device provided by the embodiments of the present invention comprises a touch layer and a display panel, and the touch layer is formed on the display panel and comprises the above touch electrode structure. Wherein, the display panel can be a thin film transistor TFT display panel, an organic light emitting diode OLED display panel and the like Herein, the types of the display panel are not limited.

For example, the material of the touch electrode structure is a transparent conductive material.

For example, the touch display device further comprises a protective layer formed on the touch layer, so as to alleviate external interferences.

For example, the touch display device further comprises an electrostatic protective layer formed between the touch layer and the display panel, to alleviate the damage rendered by static electricity to the internal structure of the display panel. During practical implementation, the electrostatic protective layer can be insulated from the touch layer.

For example, the display panel further comprises a color filter substrate and a touch circuit board, and the color filter substrate is formed with a black matrix which is provided with an alignment tag for connecting the electrode pins with the touch circuit board; the touch electrode structure is provided with at least two tag pins which are distributed at two sides of all the electrode pins.

For example, the alignment tag is a hollowed-out shape on the black matrix layer, and the hollowed-out shape is the same with the shape of the tag pin.

For example, the touch circuit board is provided with a plurality of circuit pins, the touch layer is electrically connected with the touch circuit board through the circuit pins and the electrode pins, the touch electrode structure further comprises a plurality of detection-purpose electrode pins disposed at the same layer with the electrode pins, the touch circuit board is further provided with a detection-purpose circuit pin, a conductive film is provided between the touch circuit board and the touch layer, and the detection-purpose electrode pin and the detection-purpose circuit pin are used for monitoring the conductive film.

The detection-purpose electrode pins are symmetrically disposed at the edge of all the electrode pins for connecting the touch circuit, the detection-purpose circuit pins correspond to the detection-purpose electrode pins one by one, and the surface of half of the detection-purpose circuit pins nearest the circuit pins corresponding to the electrode pins for connecting the touch circuit is not coated with copper.

For example, the number of the detection-purpose electrode pins and the detection-purpose circuit pins are at least four.

The touch display device provided by the present invention will be described hereinafter in combination with the exemplary embodiments. The exemplary embodiments make the description taking it as an example that the material of the touch electrode structure is a transparent conductive material, and a TFT display panel is taken as an example to describe the display panel, which are not intended to limit the present invention.

Figure 7:
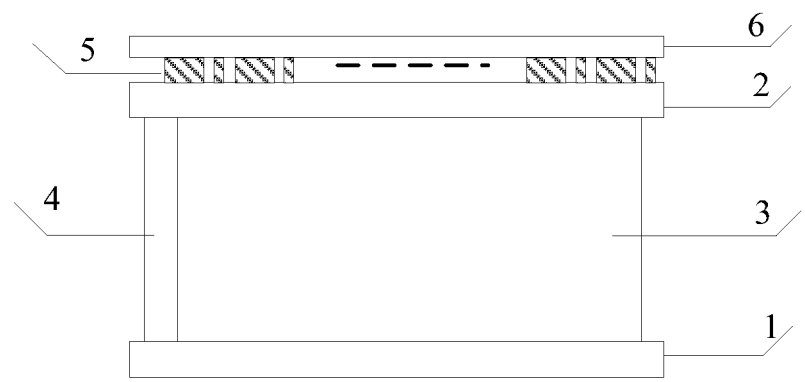
FIG. 7 is a schematic diagram of the section structure of the touch display device provided by the embodiments of the present invention.

As shown in FIG. 7, the touch display device provided by the embodiment of the present invention comprises an array substrate 1, a color filter substrate 2, a liquid crystal layer 3 between the array substrate 1 and the color filter substrate 2, and a touch circuit board 4, and further comprises: a touch layer 5 formed at the light exit side of the color filter substrate 2 and a protective layer 6 formed on the touch layer 5. Wherein, the structure of the touch layer 5 is the touch electrode structure shown in FIG. 6, and the material of the touch electrode is a transparent conductive material, for example, a transparent conductive oxide film ITO.

In the embodiments of the present invention, the touch electrode structure is directly fabricated at the light exit side of the color filter substrate, so that the touch electrode structure can not only achieve touch, but also serve as an electrostatic discharge layer, thus, the structure is simplified and the touch screen is thinner.

Figure 8:
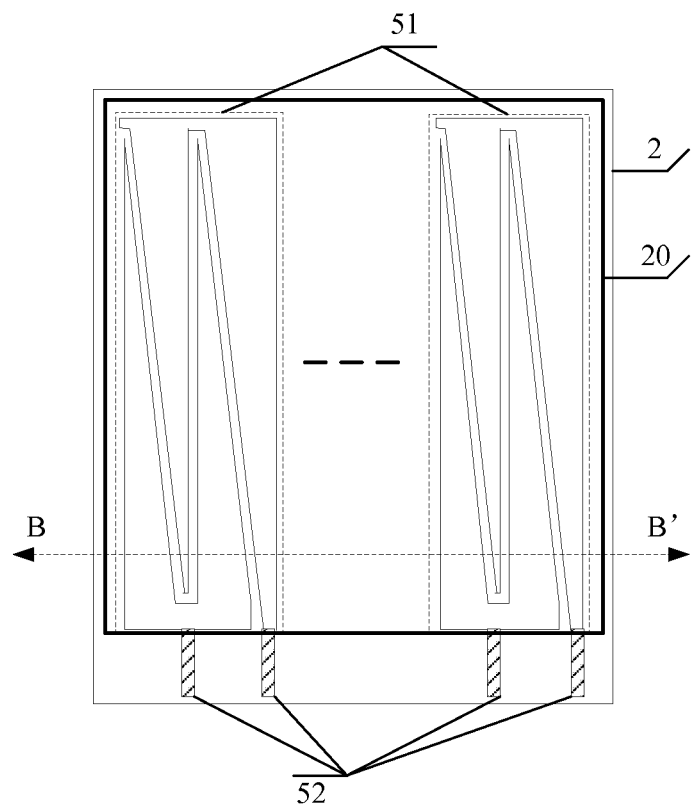
FIG. 8 is a planar schematic diagram of the touch electrode structure in the structure shown in FIG. 7.

In more detail, as shown in FIG. 8, the touch electrode structure shown in FIG. 6 is directly formed on the light exit side of the color filter substrate 2, and the electrode assemblies 51 are formed within the touch area 20, and the electrode pins are formed in a non-touch area. At the same time, section is taken along the direction B-B' shown in FIG. 8, and then the structure of the touch display device shown in FIG. 7 can be obtained.

For example, the color filter substrate is formed with a black matrix which is provided with an alignment tag for connecting the electrode pins with the touch circuit board, and the touch electrode structure is provided with at least two tag pins which are distributed at two sides of all the electrode pins.

For example, the alignment tag is a hollowed-out shape on the black matrix layer, and the hollowed-out shape is the same with the shape of the tag pins.

Figure 9:
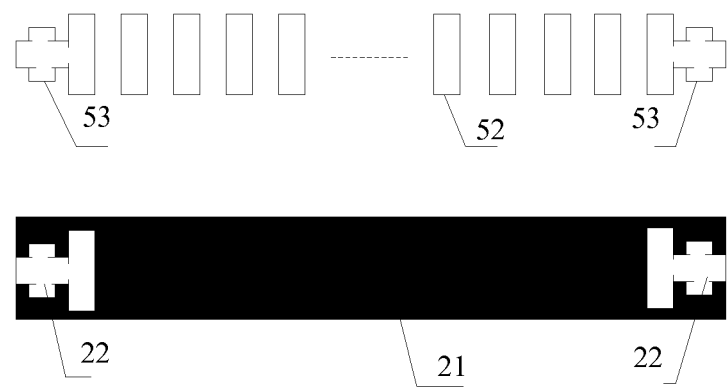
FIG. 9 is a schematic diagram of the correspondence between the electrode pins and the black matrix in the touch display device shown in FIG. 8.

During practical implementation, for example, as shown in FIG. 9, the touch electrode structure is provided with at least two tag pins 53 which are distributed at two sides of all the electrode pins 52; the black matrix 21 on the color filter substrate is provided with alignment tags 22 for connecting the electrode pins 52 with the touch circuit, and the positions of the alignment tags 22 on the black matrix correspond to the positions of the tag pins, and also, the alignment tags 22 are hollowed-out shapes on the black matrix layer, and the hollowed-out shape is the same with the graph of the tag pins. Herein, it needs to be indicated that an FOG (Flexible printed circuits board On Glass) production process is a processing manner of achieving the mechanical connection and electrical conduction of a liquid crystal glass and a flexible printed circuit board by adhering an ACF (Anisotropic Conductive Film) and hot pressing it at a certain temperature, pressure and time, and usually comprises four processes, that is, ACF pre-adhering, pre-binding, main binding and detecting. In the embodiments of the present invention, the touch electrode structure is directly formed at the light exit side of the color filter substrate, as the material of the touch electrode structure is a transparent conductive material, the touch electrode structure is slightly visible under a reflective light, and thus the alignment of the touch electrode structure of a transparent conductive material is very difficult during the pre-binding of the FOG. Therefore, the method provided by the embodiment of the present invention re-designs the pattern of the black matrix, so that during the pre-binding of the FOG, the connection and alignment of the touch electrode pins and the touch circuit board can be achieved through the shapes of the alignment tags 22 on the black matrix, and then the alignment precision is improved. In addition, it needs to be indicated that the shapes of the alignment tags is not limited to be the same with those of the tag pins.

For example, the touch circuit board is provided with a plurality of circuit pins, the touch layer is electrically connected with the touch circuit board through the circuit pins and the electrode pins, the touch electrode structure further comprises a plurality of detection-purpose electrode pins disposed at the same layer with the electrode pins, the touch circuit board is further provided with a detection-purpose circuit pin, a conductive film is provided between the touch circuit board and the touch layer, and the detection-purpose electrode pin and the detection-purpose circuit pin are used for monitoring the conductive film.

For example, the number of the detection-purpose electrode pins and the detection-purpose circuit pins are at least four.

Figure 10:
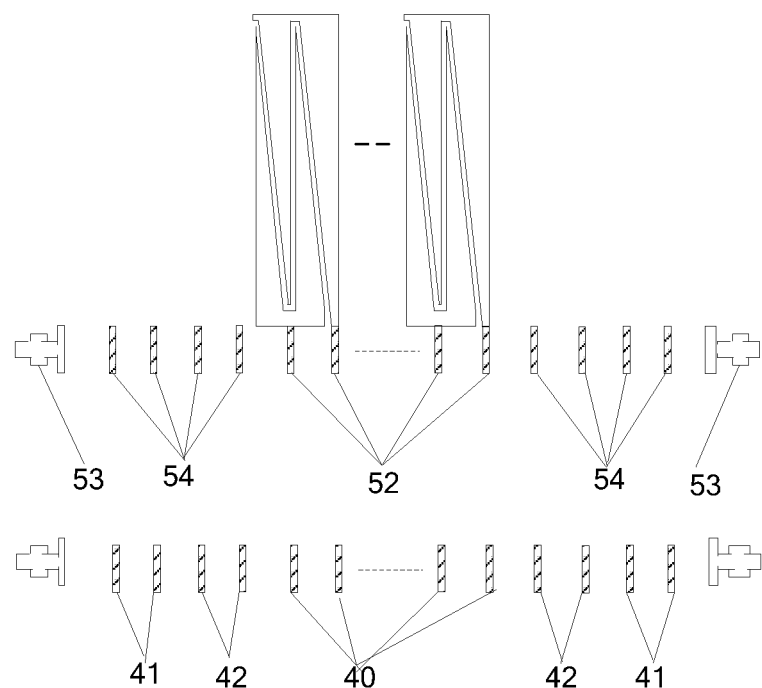
FIG. 10 is a schematic diagram of the correspondence of the pins in the touch display device shown in FIG. 8.

During practical implementation, as shown in FIG. 10, the touch circuit board 4 is provided with a plurality of circuit pins 40, the touch layer 5 is electrically connected with the touch circuit board 4 through the circuit pins 40 and the electrode pins 52, the touch electrode structure further comprises a plurality of detection-purpose electrode pins 54 disposed at the same layer with the electrode pins, the touch circuit board is further provided with a detection-purpose circuit pin 41 and a detection-purpose circuit pin 42; a conductive film is provided between the touch circuit board and the touch layer, for example, ACF particles, and the detection-purpose electrode pin and the detection-purpose circuit pin are used for monitoring the conductive film.

Wherein, the detection-purpose electrode pins 54 are symmetrically disposed at the edge of all the electrode pins 52 for connecting the touch circuit, the detection-purpose circuit pins correspond to the detection-purpose electrode pins, wherein the surface of the detection-purpose circuit pins 42 is not coated with copper, for example, the detection-purpose circuit pins 42 are symmetrically disposed at the touch circuit board, for example, at the edge of the touch circuit board. Herein, it needs to be indicated that, as the electrode pins are located within a non-touch area, the black matrix corresponding to the electrode pins among all the electrode pins within a middle area is not hollow, therefore, the electrode pins among all the electrode pins do not transmit light due to the shielding of the black matrix, it is very difficult to detect the ACF particles in the conductive film. By way of the technical solution provided by this embodiment, through adding the detection-purpose electrode pins and the detection-purpose circuit pins, the detection-purpose circuit pins are not subjected to copper plating to improve the light transmittance of the area corresponding to the detection-purpose circuit pins, thus, during the FOG process, the detection-purpose electrode pin area can be used to monitor the blasting condition of the ACF particles and then detect of the adhering yield of the FOG.

For example, all the detection-purpose electrode pins have the same shape with the electrode pins for connecting the touch circuit. Therefore, the fabricating process can be achieved more easily.

The number of the detection-purpose electrode pins can be at least four, for example, FIG. 10 shows the case of four detection-purpose electrode pins and four detection-purpose circuit pins.

For the above touch display device provided by the embodiments of the present invention, during the fabrication, by providing the touch electrode structure directly on the light exit side of the color filter substrate, the functions of touch and electrostatic discharge are achieved at the same time, also, as the touch electrode structure provided by the embodiments of the present invention is used, the report rate and linearity of the touch are both improved. Meanwhile, compared with traditional processes, the process method provided by the embodiments of the present invention can achieve double-face thinning of the LCD, that is, after the LCD is fabricated, the upper and lower faces of the LCD are first subjected to a thinning process, then the touch electrode structure is formed at the light exit side of the color filter substrate through a one-time composition process, then the FOG process is conducted, and finally it is adhered to the protective layer, and the fabrication of the touch display device is finished. Compared with traditional processes, the flatness is better and the adhering yield is higher.

Of course, the touch electrode structure provided by the embodiments of the present invention is also applicable to traditional touch display devices, that is, an electrostatic protective layer is provided between the color filter substrate and the touch layer. Therefore, referring to FIG. 11, another touch display device provided by the embodiments of the present invention comprises an array substrate 1', a color filter substrate 2', a liquid crystal layer 3' located between the array substrate and the color filter substrate, and a touch circuit board 4' provided with a touch circuit, and further comprises: an electrostatic protective layer 5' formed at the light exit side of the color filter substrate, a touch layer 6' formed on the electrostatic protective layer and a protective layer 7' formed on the touch layer, wherein, the touch layer comprises a substrate and the touch electrode structure formed on the substrate.

Figure 11:
FIG. 11 is a schematic diagram of the section structure of another touch display device provided by the embodiments of the present invention.

During practical implementation, referring to the structure shown in FIG. 11, in the touch substrate 6', the touch electrode structure is the touch electrode structure provided by the embodiments of the present invention as shown in FIG. 4. It needs to be indicated that the structure shown in FIG. 11 is the section structure of a traditional touch display device, and obviously the touch electrode structure provided by the embodiments of the present invention can also be used in the structure of the traditional touch display device.

To sum up, the embodiments of the present invention provide a touch electrode structure and a fabricating method thereof, a capacitive touch device and a touch display device. The touch electrode structure provided by the embodiments of the present invention comprises a plurality of electrode assemblies and a plurality of electrode pins for connecting a touch circuit, wherein, each electrode assembly comprises two electrodes which are insulated from each other and cross with each other complementarily, and each electrode comprises at least two sub-electrodes which are in mutual electrical connection with each other, and the sub-electrodes of different electrodes of each electrode assembly are spaced apart from each other one by one; and each electrode is connected with an electrode pin. The touch electrode structure enlarges a touch-related electrode area without adding pins or changing the gaps between the pins in the prior art, and ensures correct report of touch points and improves the touch linearity when used in the capacitive touch device. Meanwhile, compared with traditional processes, the process method provided by the embodiments of the present invention can achieve double-face thinning of the LCD, and after the thinning process, the FOG process is conducted, and finally it is adhered to the protective layer, and the fabrication of the touch display device is finished, and also, in the FOG process, the alignment is more accurate without increasing process steps. Compared with traditional LCD display modules assembled with backlight, the flatness is better and the adhering yield is higher.

Those skilled in the art shall understand that the embodiments of the present invention can be provided as methods, systems, or computer program products. Therefore, the present invention can be implemented in a way of hardware, software, or the combination of software and hardware. Also, the present invention can be implemented in a way of one or more computer program products which comprise a computer useable program code and are implemented in a computer useable storage medium (including, but not limited to, a magnetic disk storage and an optical memory and the like).

The present invention is described referring to the flow charts and/or block diagrams of the method, device (system) and computer program product of the embodiments of the present invention. It should be understandable that each flow and/or block in the flow charts and/or block diagrams, and the combinations of the flows and/or blocks in the flow charts and/or block diagrams can be realized by computer program instructions. The computer program instructions can be provided to a processor of a universal computer, a dedicated computer, an embedded processing machine or other programmable data processing device, so that the instructions are executed by the processor of the computer or other programmable data processing device to generate a device for achieving the function designated in one or more flows of the flow charts and/or one or more blocks of the block diagrams.

Such computer program instructions can also be stored in a computer readable memory that causes the computer or other programmable data processing device to work in such a manner that the instructions are stored in the computer readable memory to generate a product comprising means for implementing the instructions, and the means achieves the function designated in one or more flows of the flow charts and/or one or more blocks of the block diagrams.

Such computer program instructions can also be stored in computer readable memories that can or other programmable data processing device, so that the computer or other programmable device executes a series of operation steps to realize a computer realizable process, and then the instructions executed at the computer or other programmable device provide steps for achieving the function designated in one or more flows of the flow charts and/or one or more blocks of the block diagrams.

Described above are just illustrative embodiments of the invention, while the scope of protection of the present invention is not limited to this. Those skilled in the art can easily make various modifications and variations to the embodiments of the present invention, and such variations and modifications shall be covered within the scope of protection of the present invention, which is defined by the appended claims herein.

The invention claimed is:

1. A touch electrode structure, comprising a plurality of electrode assemblies and a plurality of electrode pins for connecting a touch circuit, and at least two tag pins which are distributed at two sides of all the electrode pins, wherein,
   each electrode assembly comprises two electrodes which are disposed at a same layer and insulated from each other and cross with each other complementarily, and each electrode comprises at least two sub-electrodes which are in mutual electrical connection with each other, and the sub-electrodes of different electrodes of each electrode assembly are spaced apart from each other one by one, and each electrode is connected with one of the electrode pins,
   wherein the touch electrode structure is formed on a color filter substrate, wherein the color filter substrate is formed with a black matrix layer which is provided with an alignment tag for connecting the electrode pins with the touch circuit, and
   wherein the alignment tag is a hollowed-out shape on the black matrix layer, and the hollowed-out shape is the same as a shape of the tag pins.

2. The touch electrode structure according to claim 1, wherein, the sub-electrodes are the shape of a triangle.

3. The touch electrode structure according to claim 2, wherein, the sub-electrodes are the shape of a right triangle.

4. The touch electrode structure according to claim 1, wherein, the electrodes, the electrode pins and tag pins are located at the same layer.

5. The touch electrode structure according to claim 4, wherein, material of the touch electrode structure is a transparent conductive material or metal material.

6. A touch display device, comprising a touch layer and a display panel, the touch layer being formed on the display panel and comprising the touch electrode structure according to claim 1.

7. The touch display device according to claim 6, wherein, material of the touch electrode structure is a transparent conductive material.

8. The touch display device according to claim 7, further comprising a protective layer formed on the touch layer.

9. The touch display device according to claim 7, wherein, the touch circuit is provided with a plurality of circuit pins, the touch layer is electrically connected with the touch circuit through the circuit pins and the electrode pins, the touch electrode structure further comprises a plurality of detection-purpose electrode pins disposed at the same layer with the electrode pins, the touch circuit is further provided with detection-purpose circuit pins, a conductive film is provided between the touch circuit and the touch layer, and the detection-purpose electrode pin and the detection-purpose circuit pin are used for monitoring the conductive film.

10. The touch display device according to claim 9, wherein, numbers of the detection-purpose electrode pins and the detection-purpose circuit pins are at least four.

11. A method for fabricating a touch electrode structure, comprising:
   forming a plurality of electrode assemblies and a plurality of electrode pins for connecting a touch circuit, and at least two tag pins which are distributed at two sides of all the electrode pins, wherein,
   each electrode assembly comprises two electrodes which are disposed at a same layer, insulated from each other and cross with each other complementarily, and each electrode comprises at least two sub-electrodes which are in mutual electrical connection with each other, and the sub-electrodes of different electrodes of each electrode assembly are spaced apart from each other one by one, and each electrode is connected with one of the electrode pins, wherein the touch electrode structure is formed on a color filter substrate, wherein the color filter substrate is formed with a black matrix layer which is provided with an alignment tag for connecting the electrode pins with the touch circuit, and wherein the alignment tag is a hollowed-out shape on the black matrix layer, and the hollowed-out shape is the same as a shape of the tag pins.

12. The method according to claim 11, wherein, the sub-electrodes are the shape of a triangle.

13. The method according to claim 12, wherein, the sub-electrodes are the shape of a right triangle.

14. The method according to claim 11, wherein, the electrodes, the electrode pins and tag pins are located at the same layer.

15. The method according to claim 14, wherein, material of the touch electrode structure is a transparent conductive material or metal material.

\* \* \* \* \*